July 12, 1932.    E. R. STONE    1,867,189
COMBUSTION APPARATUS
Filed Aug. 1, 1931
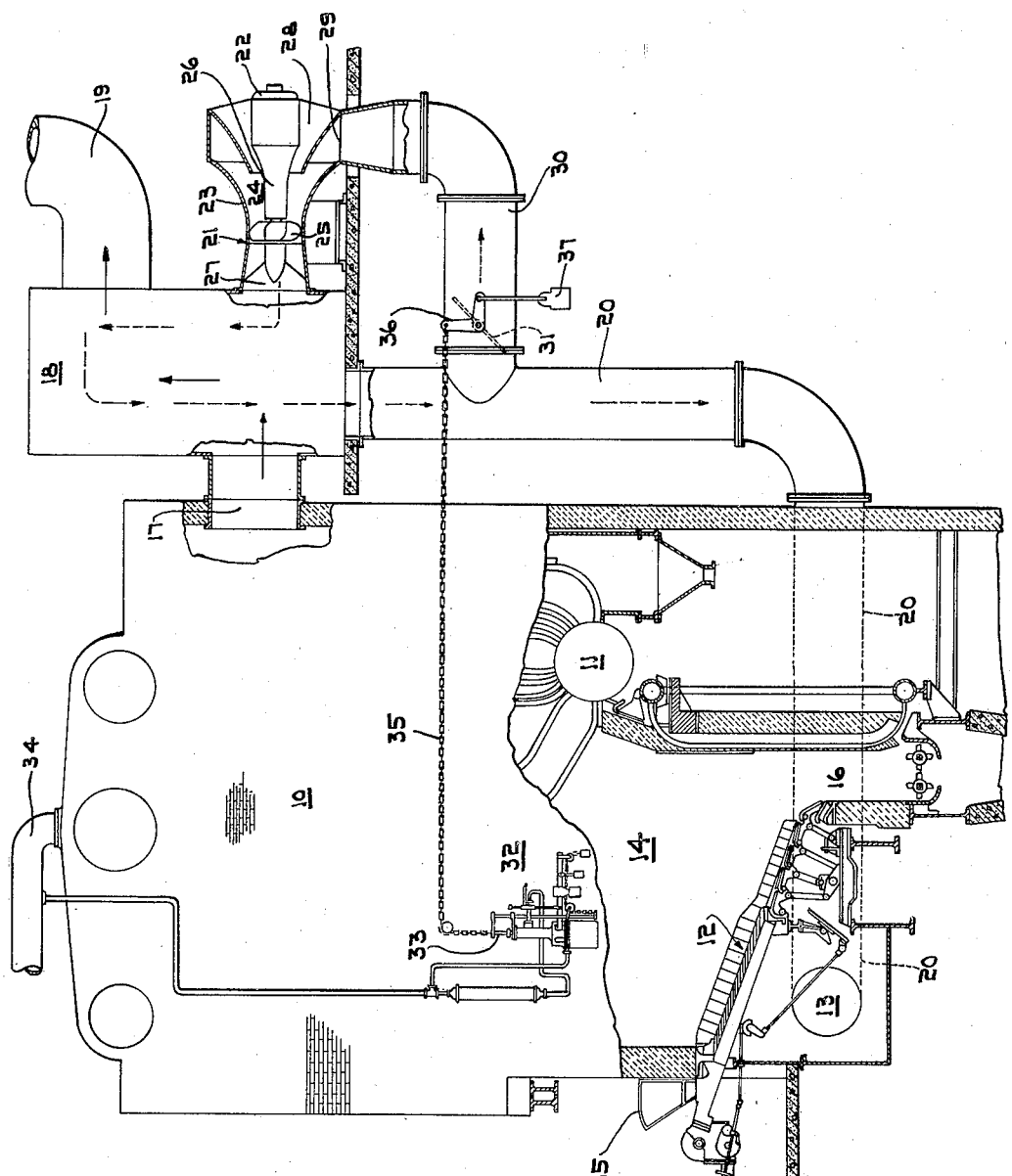
WITNESSES:
G. D. Hicks
E. Lutz
INVENTOR
Earll R. Stone
BY
a. B. Reavis
ATTORNEY Patented July 12, 1932

1,867,189

UNITED STATES PATENT OFFICE

EARLL R. STONE, OF LANDSDOWNE, PENNSYLVANIA, ASSIGNOR TO WESTINGHOUSE ELECTRIC & MANUFACTURING COMPANY, A CORPORATION OF PENNSYLVANIA

COMBUSTION APPARATUS

Application filed August 1, 1931. Serial No. 554,477.

My invention relates to combustion apparatus and more particularly to furnaces in which the air supplied thereto for supporting combustion is preheated by the waste flue gases, and it has for a broad object to improve the overall efficiency of this type of apparatus.

In apparatus of this character, heretofore known to me, it is customary to provide a preheater having a passage or passages providing for the flow of the waste gases therethrough, and another passage or passages disposed in heat-exchange relation with respect to those first-named and providing for the flow therethrough of air for supporting combustion. Usually, a fan of the centrifugal or impeller type is provided for forcing the air through the preheater and to the furnace. In order to regulate the flow of air to the furnace, a suitable damper is disposed within the conduit usually connecting the air outlet of the preheater with the air inlet of the furnace.

Combustion apparatus of the type above referred to, operates more efficiently than the furnaces which employ only cold air for combustion for the following reasons: first, a portion of the heat in the waste gases is abstracted therefrom and is returned to the furnace; and second, more efficient combustion of the fuel is carried on in the furnace, both for the reason that the furnace temperature is higher and also for the reason that a less amount of heat is abstracted from the furnace in heating up the entering air to ignition temperature. The degree of benefit derived from the preheated air systems will of course vary with the type of furnace, the type of fuel burned, and the type of apparatus used for burning the fuel.

In prior apparatus of this character, the temperature of the waste gases at the point of entering the preheater is a function of the rate of combustion carried on in the furnace. Therefore, the amount of heat abstracted from the flue gases is substantially less at low furnace ratings than at high ratings; the temperature of the air entering the furnace is lower; and less heat will be returned to the furnace.

In some types of combustion apparatus, for example, in stoker-fired furnaces, it is desirable to maintain the temperature of the preheated air at a fairly constant value and not to exceed this even at the higher ratings. While, in other types of combustion apparatus, for example, pulverized fuel furnaces, it may be found desirable to maintain a constant overall efficiency by keeping the temperature of the waste gases at the exit of the preheater at a constant value. In prior apparatus, neither of these results are possible.

It is, therefore, a more specific object of this invention to provide combustion apparatus utilizing preheated air, in which the overall efficiency is materially increased by increasing substantially the total amount of heat abstracted from the flue gases.

It is a further object to produce combustion apparatus of this type, by virtue of which it is possible to either maintain a constant temperature of preheated air or a constant temperature of waste gases at the exit of the preheater.

A further object is to provide an efficient, a simple, a compact, and a comparatively cheap apparatus for delivering preheated air to a furnace.

A still further object is to provide apparatus of the character outlined in the preceding object, which regulates the temperature of the air flowing to the furnace in response to an operating characteristic of the furnace.

These and other objects are effected by my invention, as will be apparent from the following description and claims taken in connection with the accompanying drawing, forming a part of this application, in which:

The single figure of the drawing illustrates, partially in side elevation and partially in vertical section, my improvement as applied to a furnace of the stoker-fired type.

According to one preferred embodiment of my invention, I provide an air preheater utilizing the heat of the waste flue gases of a furnace to preheat the air supplied for supporting combustion. I provide further a conduit conveying such preheated air from the preheater to the furnace, a propeller type blower for delivering air under pressure to the preheater, means for by-passing the preheated air from the conduit means to the inlet of the blower, and means operating in response to an operating characteristic of the furnace for regulating the flow of air through the by-passing means.

Thus, varying amounts of the air coming from the preheater can be recirculated through the preheater, and as a result, provision is made for abstracting any desired amount of heat from the flue gases. If it is desired to maintain a constant temperature of preheated air, more and more air can be recirculated as the furnace rating decreases. Also, if the desideratum is to maintain a constant exit gas temperature, more and more air can be circulated as the rating goes up. The former, as stated, is considered desirable in furnaces of the stoker-fired type and the latter may be considered as desirable in the pulverized fuel type.

Referring now in detail to the construction illustrated in the accompanying drawing, I have shown my improvement as applied to a stoker-fired boiler furnace. The reference numeral 10 indicates, in its entirety, this type of apparatus which includes a boiler 11 and a progressive feed stoker 12, the latter dividing the furnace into an air chamber or wind box 13 and a combustion chamber 14.

Coal is fed into the furnace from a hopper 15 and is fed along the stoker by suitable mechanism incorporated therein. Refuse collects and the combustible therein is burned out in a clinker pit 16. The coal is burned as it moves down the stoker, and the flame and hot gases pass upwardly through the boiler tubes which abstract the major portion of the heat. The waste gases pass out of the furnace through an opening 17 and to a conventional type preheater 18 and thence to the atmosphere by way of a pipe or stack 19.

Air for supporting combustion flows through the stoker and fuel bed supported thereon from the wind box 13. Preheated air is supplied to the wind box by a conduit 20 connecting the wind box with the preheater.

The air preheater shown on the drawing may be constructed in any well-known manner. A detailed showing and description of the preheater is deemed unnecessary as the construction and operaton thereof is well-known to those skilled in art, it being sufficient to say that the waste gases flow through a passage or passages provided in the preheater and that the air for combustion flows through another passage or passages which is disposed in heat exchange relation with respect to the first-named passage or passages.

Air for combustion is supplied under pressure to the preheater 18 by means of a propeller type blower 21 driven from a constant speed motor 22. The blower 21 comprises a housing 23 defining a converging diverging passage 24 for the air, and a propeller 25 mounted on a shaft 26, the motor 22 being connected to such shaft. The housing 23 includes an outlet opening 27 communicating with the air inlet of the preheater and inlet openings 28 and 29 communicating, respectively, with the atmosphere and with a by-pass conduit 30, the latter connecting the conduit 20 with the inlet side of the blower, as shown.

The rate of combustion in the furnace is, of course, dependent upon the amount of air supplied thereto. In the stoker-fired furnace, it is desired that the temperature of the preheated air entering the furnace be at a substantially constant value. To this end, I vary the amount of air flowing to the furnace by controlling the amount recirculated through the fan and preheater by the by-pass conduit. A damper 31 is disposed within the conduit 30 and controls the flow of air through such conduit and thereby controls the amount of air which flows to the wind box. When the damper 31 is closed, the maximum amount of air flows to the wind box and the furnace is at the maximum combustion rate, and when the damper is full open, the minimum amount of air flows to the wind box and hence the furnace rating is at the minimum.

As hereinbefore stated, the temperature of the flue gases flowing through the preheater varies with the rate of combustion carried on in the furnace. According to the prior practice, the temperature of the air entering a furnace is materially less at the lower ratings than at the higher ratings. When my improvement is applied to a stoker-fired furnace, there is very little change in the temperature of the air in the wind box, this being due to the fact that, as the furnace rating decreases, the damper 31 is operated to increase the amount of air recirculated through the conduit 30, and thereby increasing the amount of heat abstracted from the flue gases and increasing the overall efficiency of the apparatus.

Hence, over the range of furnace operation, substantially more heat is abstracted from the flue gases and returned to the furnace than is the case with the prior apparatus. Furthermore, the high efficiency of combustion in the stoker-fired furnace is maintained over the entire range of operation, due to the maintenance of the preheated air in the wind box at the higher and approximately constant temperatures.

It is to be understood, however, that while I have illustrated my invention as applied to a stoker-fired boiler furnace, it is not so limited. For, in so far as the broad aspects of the invention are concerned, it might be applied equally as well to any fuel-burning furnace, for example, a pulverized fuel furnace, an oil fired or a gas fired furnace. Further, the heat given off by combustion may be used for purposes other than producing steam.

In the application of my invention shown, I also provide for automatic operation of the damper 31 in response to an operating characteristic of the furnace. In the drawing, I have shown a standard Mason regulator 32, including an operating element 33, which moves in response to the pressure of the steam in a pipe 34 leading from the boiler. The regulator is so constructed that as the steam pressure goes up, the element 33 moves up, and as the pressure of the steam goes down, the element 33 goes down. The element 33 operates the damper 31 by a chain 35 and lever 36 having a counterweight 37 secured thereto. Hence, as the element 33 moves up, due to a rise in steam pressure, the damper 31 opens thereby increasing the flow of air through the conduit 30 and decreasing the amount of air flowing to the wind box, and conversely as the steam pressure falls the damper is closed thereby decreasing the amount of air recirculated through the preheater and increasing the amount of air admitted to the wind box.

It is to be further understood that the particular operating characteristic and the particular apparatus used for obtaining automatic operation of the damper are immaterial so far as the present invention is concerned. Any other operating characteristic of the furnace may be used equally as well, for example, fuel feed, air flow, steam flow, draft loss, or devices responsive to the temperature of the exit gases.

A further feature of my invention is the simple, efficient and comparatively low cost of the apparatus used in obtaining the results mentioned. This apparatus is especially advantageous where it is desired to maintain the preheated air at a constant temperature. The propeller blower 21 is of the type disclosed in the U. S. Letters Patent 1,596,459 to Henry F. Schmidt, granted August 17, 1926. This blower is well-adapted for use in the apparatus disclosed for the reasons that it is highly compact, simple, and is inexpensive to build.

A characteristic feature of propeller type blowers is that they utilize a small amount of power and are very efficient when operated within a comparatively close range of speed, and without excessive resistance at the outlet such as is caused by throttling. The horsepower utilized by a propeller blower increases with the amount of restriction offered to the flow of fluid therefrom and if, as in the prior constructions, dampers are used to throttle or regulate the amount of air flowing from the blower to the wind box, the horsepower required to drive the blower increases with the degree of restriction offered by the damper.

Hence, in the prior constructions, propeller blowers are considered impractical, and the inherent advantages thereof cannot be realized. However, such advantages can be realized in the present apparatus, for there is no throttling of the air from the blower. All of the air delivered by the blower either flows to the wind box of the furnace or is by-passed to the inlet side of the blower. The damper 31 merely diverts the air to the furnace or permits such air to flow through the by-pass conduit.

While I have shown my invention in but one form, it will be obvious to those skilled in the art that it is not so limited, but is susceptible of various changes and modifications without departing from the spirit thereof, and I desire, therefore, that only such limitations shall be placed thereupon as are imposed by the prior art or as are specifically set forth in the appended claims.

What I claim is:

1. In combustion apparatus, the combination with a furnace having an air inlet and a waste gas outlet; of an air preheater utilizing the heat of the waste gases discharged from the furnace to preheat the air supplied to the furnace for supporting combustion; conduit means for conveying such preheated air from the preheater to the air inlet of the furnace; fluid translating means for delivering air under pressure to the preheater; means for by-passing the preheated air from said conduit means to the inlet of the fluid translating means; and means for controlling the flow of fluid through the by-passing means.

2. In combustion apparatus, the combination with a furnace having an air inlet and a waste gas outlet; of an air preheater utilizing the heat of the waste gases discharged from the furnace to preheat the air supplied to the furnace for supporting combustion; conduit means for conveying such preheated air from the preheater to the air inlet of the furnace; a propeller type blower for delivering air under pressure to the preheater; means for by-passing the preheated air from said conduit means to the inlet of the propeller type blower; and means for controlling the flow of fluid through the by-passing means.

3. In combustion apparatus, the combination with a furnace having an air inlet and a waste gas outlet; of an air preheater utilizing the heat of the waste gases discharged from the furnace to preheat the air supplied to the furnace for supporting combustion; conduit means for conveying such preheated air from the preheater to the air inlet of the furnace; fluid translating means for delivering air under pressure to the preheater; means for by-passing the preheated air from said conduit means to the inlet of the fluid translating means; and means operating in response to an operating characteristic of the furnace for regulating the flow of air through the by-passing means.

4. In combustion apparatus, the combination with a furnace having an air inlet and a waste gas outlet; of an air preheater utilizing the heat of the waste gases discharged from the furnace to preheat the air supplied to the furnace for supporting combustion; conduit means for conveying such preheated air from the preheater to the air inlet of the furnace; a propeller type blower for delivering air under pressure to the preheater; means for by-passing the preheated air from said conduit means to the inlet of the propeller type blower; and means operating in response to an operating characteristic of the furnace for regulating the flow of air through the by-passing means.

5. In combustion apparatus, the combination with a furnace having an air inlet and a waste gas outlet; of an air preheater utilizing the heat of the waste gases discharged from the furnace to preheat the air supplied to the furnace for supporting combustion; conduit means for conveying such preheated air from the preheater to the air inlet of the furnace; a propeller type blower for delivering air under pressure to the preheater; means for driving the blower at a constant speed; means for by-passing the preheated air from said conduit means to the inlet of the propeller type blower; and means for controlling the flow of fluid through the by-passing means.

6. In combustion apparatus, the combination with a furnace having an air inlet and a waste gas outlet; of an air preheater utilizing the heat of the waste gases from the furnace to preheat the air supplied to the furnace for supporting combustion; conduit means for conveying such preheated air from the preheater to the air inlet of the furnace; a propeller type blower for delivering air under pressure to the preheater; means for driving the blower at a constant speed; means for by-passing the preheated air from said conduit means to the inlet of the propeller type blower; and means operating in response to an operating characteristic of the furnace for regulating the flow of air through the by-passing means.

In testimony whereof, I have hereunto subscribed my name this 29th day of July, 1931.

EARLL R. STONE.